(12) United States Patent
Vismara

(10) Patent No.: US 6,547,295 B2
(45) Date of Patent: Apr. 15, 2003

(54) IMPACT ENERGY ABSORPTION SYSTEM FOR VEHICLES

(75) Inventor: Mario Vismara, Casatenovo (IT)

(73) Assignee: Adlev S.r.l., Monza (IT)

( * ) Notice: Subject to any disclaimer, the term of this patent is extended or adjusted under 35 U.S.C. 154(b) by 0 days.

(21) Appl. No.: 09/975,808

(22) Filed: Oct. 12, 2001

(65) Prior Publication Data

US 2002/0043809 A1 Apr. 18, 2002

(30) Foreign Application Priority Data

Oct. 18, 2000 (IT) .......................... MI20A2250

(51) Int. Cl.[7] .............................................. B60R 19/34
(52) U.S. Cl. ...................... 293/133; 293/136; 293/132; 293/120
(58) Field of Search ................. 293/133, 120, 293/132, 136, 109, 122, 134, 121, 102; 188/377, 374, 371, 376; 280/751, 784

(56) References Cited

U.S. PATENT DOCUMENTS

| | | | | |
|---|---|---|---|---|
| 3,694,018 A | * | 9/1972 | Levering ................... | 293/136 |
| 3,926,463 A | * | 12/1975 | Landwehr et al. ......... | 293/136 |
| 4,149,742 A | * | 4/1979 | Fannin et al. ............. | 293/136 |
| 4,190,276 A | * | 2/1980 | Hirano et al. ............. | 293/133 |
| 4,252,355 A | * | 2/1981 | Goupy et al. .............. | 293/132 |
| 4,272,114 A | * | 6/1981 | Hirano et al. ............. | 293/133 |
| 4,357,040 A | * | 11/1982 | Tomioka et al. ........... | 293/102 |
| 4,482,180 A | * | 11/1984 | Huber et al. .............. | 293/136 |
| 4,971,376 A | * | 11/1990 | Eipper et al. .............. | 293/134 |
| 5,056,840 A | * | 10/1991 | Eipper et al. .............. | 293/133 |
| 5,106,137 A | * | 4/1992 | Curtis ...................... | 293/107 |
| 5,139,297 A | * | 8/1992 | Carpenter et al. ......... | 293/132 |
| 5,154,462 A | * | 10/1992 | Carpenter ................. | 293/120 |
| 5,611,568 A | * | 3/1997 | Masuda ..................... | 280/784 |
| 5,876,077 A | * | 3/1999 | Miskech et al. ........... | 293/132 |
| 5,957,512 A | * | 9/1999 | Inada et al. ............... | 293/120 |
| 5,967,592 A | * | 10/1999 | Freeman ................... | 293/120 |
| 5,984,389 A | * | 11/1999 | Nuber et al. .............. | 293/136 |
| 6,065,786 A | * | 5/2000 | Wheatley ................... | 293/125 |
| 6,085,878 A | * | 7/2000 | Araki et al. ............... | 188/377 |
| 6,312,028 B1 | * | 11/2001 | Wilkosz ..................... | 293/133 |
| 6,325,431 B1 | * | 12/2001 | Ito ........................... | 293/120 |
| 6,412,836 B1 | * | 7/2002 | Mansoor et al. ........... | 293/133 |
| 2002/0125725 A1 | * | 9/2002 | Satou ........................ | 293/132 |

* cited by examiner

*Primary Examiner*—Kiran Patel
(74) *Attorney, Agent, or Firm*—Hedman & Costigan, P.C.

(57) ABSTRACT

An impact energy absorption system for vehicles, comprising a cross member (16) housing a series of composite alveolar structures or buffers (10, 10A) which co-operate with an element (14) made of foamed plastic resin; the alveolar structure (10, 10A) is made of plastic resin preferably derived from polycarbonate and can feature a taper at at least one of the longitudinal ends where a containment element (22) can be provided.

12 Claims, 3 Drawing Sheets

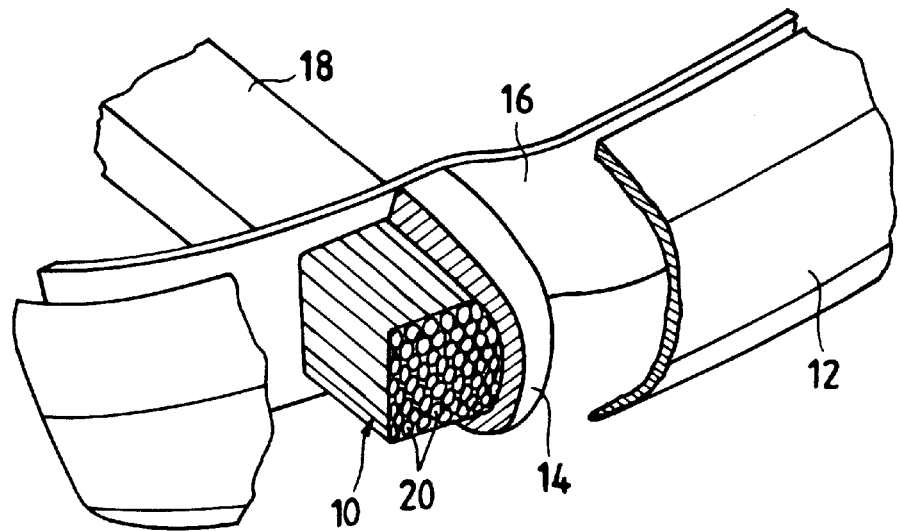
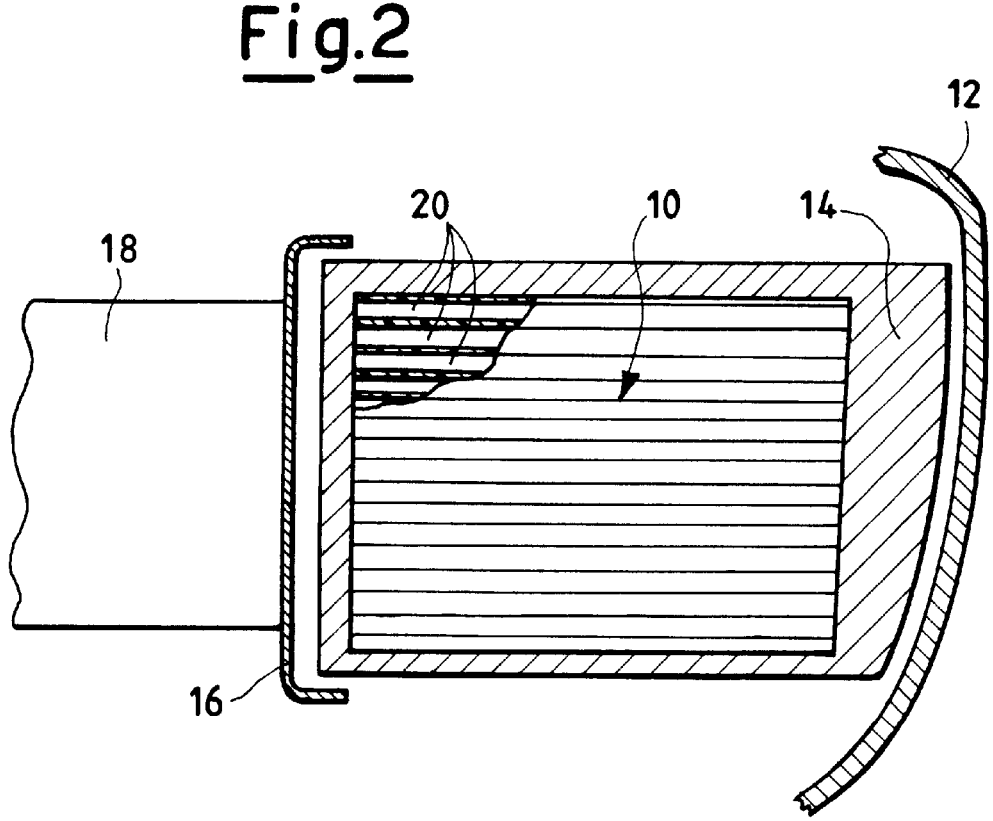

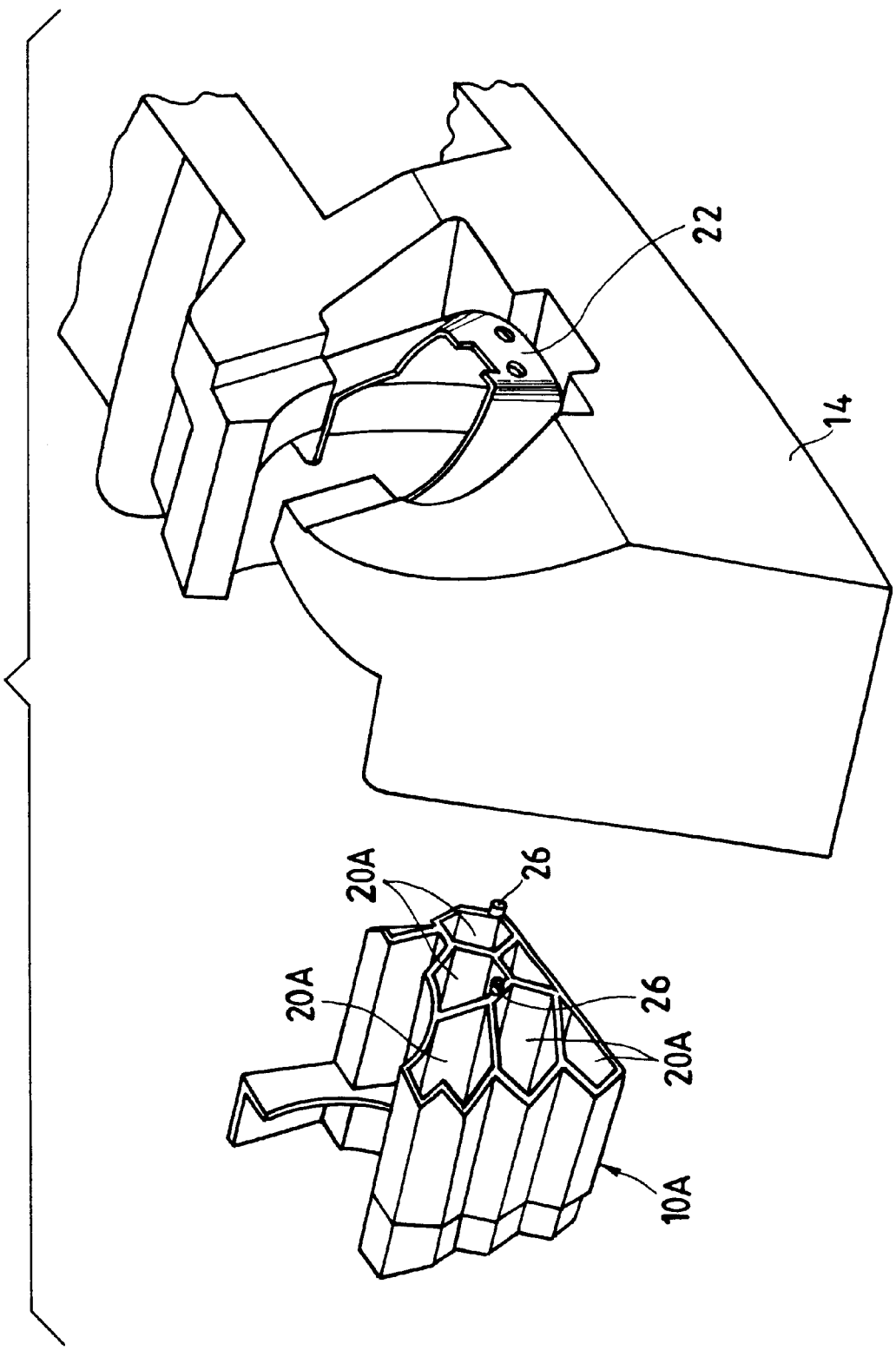

IMPACT ENERGY ABSORPTION SYSTEM FOR VEHICLES

The present invention concerns an impact energy absorption system, in particular for motor vehicles.

Different impact energy absorption systems for vehicles currently exist.

Some systems use completely metallic cross members, generally made of steel, positioned between the vehicle chassis and the bumpers, while others use buffers, which are located between appropriate side members or struts of the chassis and the bumpers.

In particular, as honeycombs are structures generally characterised by good impact absorption properties, they have been applied where it is necessary to reduce the effects of any impact on persons or means of locomotion (in particular to protect structural parts of motor vehicles).

Some recent impact absorption systems feature a composite alveolar structure embedded in a foamed resin deformable element, which is positioned between a cross member fixed to a side member or strut of the vehicle chassis and the external bumper.

The deformable element consists of the alveolar absorption structure and the foamed resin, while the honeycomb structure consists of a series of alveoli, joined together, in the shape of prisms with hexagonal section, made of aluminium and positioned corresponding to each chassis strut.

Said known impact absorption systems have numerous limits and serious disadvantages, however.

Firstly, for systems with completely metallic cross member, it is practically impossible to simultaneously comply with the different vehicle impact regulations specifically for relative speed values of 4 km/h (simulation of impact during parking) and 15 km/h; in this regard, it should be remembered, for example, that the impact test at 15 km/h is considered, in some countries, to be a reference for the definition of vehicle insurance premiums, in relation to assessment of the damage sustained in the tests.

Furthermore, it should also be pointed out that, in the impact tests at 15 km/h, the impact occurs on the front and rear sides of the vehicles, on a portion equal to 40% of their width.

Therefore, in absorption systems that feature the use of buffers corresponding only to the chassis struts, there can be permanent deformation of the metal cross members, near the longitudinal centre line axis of the vehicle, in the event of impact at a relative speed of at least 15 km/h unless particularly reinforced cross members are used, which are consequently very heavy and expensive. These systems also have a poor capacity for absorbing impact in a slanting direction with respect to the longitudinal axis of the vehicle.

In particular, since the alveolar structures or buffers are normally used only corresponding to the chassis struts, this means that, in the event of impact at 15 km/h, to contain the internal deformation of the deformable element and of the vehicle internal cross member (and, therefore, to avoid permanent deformation of the vehicle bodywork elements), the area of the resisting sections must be increased, with consequent increase in weight and total production costs.

The object of the present invention is, therefore, to eliminate the above disadvantages, producing a high-efficiency impact energy absorption system for vehicles.

Another object of the present invention is to produce an impact energy absorption system for vehicles which simultaneously complies with the requirements of the various regulations, in particular in relation to impact at 4 km/h and 15 km/h, difficult to reconcile with the known products.

Another object of the present invention is to produce a system that can withstand repeated impact at low speed (4 km/h) without requiring replacement of any of its components and the bumper.

Another object of the present invention is to indicate an impact energy absorption system for vehicles that avoids permanent deformation of the cross members and bodywork elements of the vehicles in the event of impact at 15 km/h.

A further object of the present invention is to indicate an impact energy absorption system for vehicles, in particular for motor vehicles, which is extremely efficient also for impact in a slanting direction with respect to the longitudinal axis of the vehicle.

Last but not least, a further object of the invention is to produce an impact energy absorption system that is simpler and safer and also efficient and extremely reliable with respect to the known absorption systems.

These and other objects, according to the present invention, are achieved by producing an impact energy absorption system for vehicles according to claim 1, which is here referred to for the sake of brevity.

Advantageously, the system subject of the present invention has more limited overall dimensions and is considerably cheaper and lighter than the traditional systems, while offering the same level of performance.

With the same overall dimensions and weight, in addition to production costs, the absorption system according to the present invention offers much better performance in terms of ultimate strength, stability of mechanical characteristics over a wide temperature range, greater efficiency during impact and ease of use.

The characteristics and advantages of an impact energy absorption system for vehicles according to the present invention will become clearer from the following description intended as a non-restrictive example, referring to the attached schematic drawings in which:

FIG. 1 is a perspective view, partially in section, of a first form of embodiment of an impact energy absorption system for vehicles, according to the present invention;

FIG. 2 is a partially enlarged and partially sectioned view of FIG. 1;

FIG. 3 is a partially exploded view of a second form of embodiment of an impact energy absorption system for vehicles according to the present invention;

Figure 4:
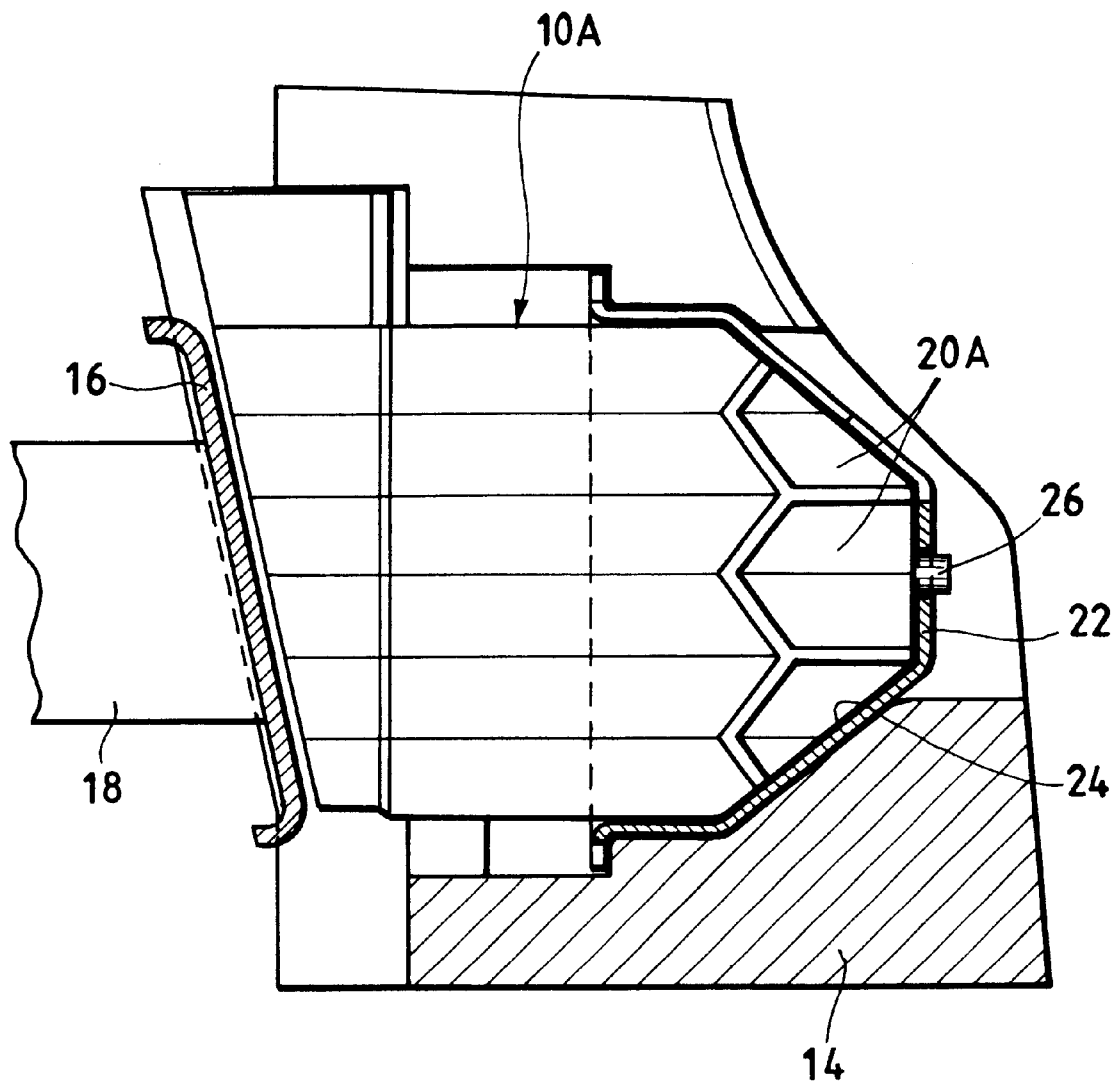
FIG. 4 is a partially sectioned view of the system as per FIG. 3 in assembled form.

With reference to the figures mentioned, an impact energy absorption system for vehicles comprises a cross member 16 which houses a series of composite alveolar structures (in plastic resin honeycomb) or buffers, indicated by 10 and 10A, each assembled with a shaped element 14 in foamed plastic resin, preferably foamed polypropylene.

The element 14 can completely or only partially cover the buffers 10 and 10A and is shaped in order to protect the bumper 12 from the intrusive action of the composite alveolar structures or buffers 10, 10A resulting from low energy impact, and to absorb impact in a slanting direction with respect to the vehicle axis.

As a guide, the greatest efficiency in terms of dynamic impact absorption is obtained for materials and systems in which 40% of the energy is absorbed elastically and the remaining 60% inelastically.

Furthermore, it is fundamentally important that this type of impact response remains practically constant over a sufficiently wide temperature range.

Foamed polypropylene has these dynamic impact response characteristics and is therefore particularly suitable for use as a material constituting the shaped element 14.

Each alveolar structure 10, 10A features a series of alveoli, indicated by 20, 20A respectively, adjacent to each other, while the element 14 is shaped in order to adapt to the overall dimensions of the adjacent structures (for example, in the case of motor vehicles, it will feature recesses and housings for the headlights, indicators and other vehicle accessories).

A function of the foamed resin 14 is to absorb, in a partially elastic manner, low energy impact (for example impact at 4 km/h) in order to limit or prevent permanent deformation of the buffers 10, 10A.

Another function is to prevent, following impact, smashing of the bumpers indicated by 12 in FIGS. 1 and 2, due to the effect of the most rigid system components, i.e. the alveolar structures 10, 10A.

A further function of the foamed resin 14 is to permit the absorption of impact in a slanting direction with respect to the longitudinal axis of the vehicles.

The honeycomb structure 10, 10A, which is characterised by good impact absorption properties, as is known, can be produced in the following types: extruded in plastic or injection-moulded in plastic.

In particular, the structure indicated by 10 in FIGS. 1 and 2 can refer to a plastic extruded honeycomb; honeycombs extruded in plastic, preferably polycarbonate, consist basically of a series of extruded tubes, subsequently glued or welded together to form the alveolar structure; since their walls are relatively thin, they work well for average specific compression.

The structure indicated by 10A in FIGS. 3 and 4 refers to a plastic injection-moulded honeycomb.

In particular, the honeycomb 10A, as can be clearly seen in FIG. 4, features a taper at at least one of its longitudinal ends in order to reduce the peak value of the energy absorbed which, in general, decreases as the taper narrows; furthermore, the plastic preferably used is a plastic-resin derived from polycarbonate (in this regard, the Xenoy® resin by General Electric can be used, for example) or rubber-filled polypropylene. The Xenoy® resin is characterised by the fact that it has a high ultimate elongation value and maintains its mechanical characteristics basically stable over a wide temperature range (from −40° C. to +80° C.).

The high ultimate elongation value of said resins means that injection-moulded honeycombs 10A can be obtained offering greater efficiency than the known injection-moulded honeycombs; in fact, during impact, the internal walls of the honeycombs 10A do not collapse and therefore effectively absorb the impact energy, transforming it into deformation energy.

On the other hand, it should be remembered that the outer walls of these honeycomb structures 10A undergo a very high level of deformation, breaking very soon. In order to further increase their efficiency, therefore, according to the invention, special elements are preferably adopted, indicated by 22 in FIGS. 3 and 4, for containing or retaining the deformations which, in the event of absorption of impact energy between motor vehicles, are positioned inside appropriate housings 24 made in the element 14 and kept in position by stops and retainers 26.

The elements 22 are sized in order to withstand considerable stress, due both to the impact and consequent lateral thrust caused by deformation of the outer walls of the alveolar structure 10A; this results in total prevention of deformation exceeding the breaking limits of the material, also corresponding to the outer walls which, as they do not collapse or explode, continue to absorb impact energy, transforming it into deformation energy.

The containment elements 22 can be made of high resistance material, for example steel.

The effect of these elements 22 on the overall weight of the absorption system is modest as their volume is well below the overall volume of the system and therefore even if materials with a high specific weight are used, such as steel, the overall weight of the system is in any case less than the traditional absorption systems.

Finally, the containment elements 22 do not necessarily have to be made integral, by means of glue or welding, with the alveolar structures 10, 10A and can be obtained directly on the vehicle.

The impact energy absorption system for vehicles, according to the invention, can also comprise at least one metal cross member 16 positioned between the side members or struts 18 of the vehicle chassis and the composite buffers 10, 10A.

As clearly shown in FIG. 1, thanks to the presence of the cross member 16, the composite buffers 10, 10A can be positioned both corresponding to the struts 18 and adjacent to them; in this case, the possibility of positioning two or more buffers 10, 10A not only corresponding to the struts 18 but also in positions near the longitudinal axis of the vehicles limits deformation of the cross members 16 to elastic (i.e. non-permanent) deformation also in the event of impact occurring between two or more vehicles at relative speed values of around 15 km/h and for cross members 16 that are substantially lightweight compared to those used traditionally in the known absorption systems.

From the description provided, the characteristics of the impact energy absorption system for vehicles, according to the present invention, are clear and likewise the advantages thereof.

In particular, said advantages are as follows:

possibility of designing systems (consisting of elastic buffer, plastic buffer, cross member) valid for a number of motor vehicle versions, in relation to the shape of their bodywork, their weight and the impact regulations with which they are required to comply;

easy to simultaneously comply with the various impact regulations at various speeds;

possibility of obtaining elastic and therefore non-permanent deformation of the metal cross members positioned between the struts of the vehicle chassis in the event of impact at relative speeds of around 15 km/h;

high absorption capacity for impact in a slanting direction with respect to the longitudinal axis of the vehicles;

limited weight and overall dimensions;

simultaneous possibility of limiting deformation of the metal cross member of the vehicle to a restricted space in order to prevent possible deformation of the vehicle bodywork elements;

limited costs as a result of the advantages achieved.

Finally, it is clear that further modifications and variations can be made to the impact energy absorption system for vehicles while remaining within the scope of the inventive idea; likewise it is clear that the materials and dimensions illustrated can be varied according to technical requirements.

What is claimed is:

1. Impact energy absorption system for vehicles, comprising a cross member (16), positioned between at least two side members or struts (18) of the vehicle chassis, enclosing a number of composite honeycomb structures or buffers (10, 10A) assembled each with at least one element (14) in foamed plastic resin positioned inside a bumper (12) of the vehicle, in wich said honeycomb structure (10, 10A) is made of plastic resin derived from polycarbonate.

2. Absorption system as in claim 1, characterised in that said honeycomb structures (10, 10A) and said foamed plastic resin elements (14) are arranged, supported by said cross member (16), both corresponding to said struts (18) and in positions adjacent to them, preferably in positions near the longitudinal axis of said vehicles in order to limit deformation of said cross members (16) to elastic deformation and avoid possible deformation of the side members or struts (18).

3. Absorption system as in claim 1, characterised in that said foamed plastic resin elements (14) consist of a material that absorbs dynamic impact elastically and inelastically over a set temperature range, in particular foamed polypropylene.

4. Absorption system as in claim 1, characterised in that each buffer (10, 10A) has a honeycomb structure and features a series of adjacent alveoli (20, 20A).

5. Absorption system as in claim 1, characterised in that said foamed plastic resin element (14) deforms in a reversible manner as a result of low energy impact and is shaped to protect the bumper (12) from the intrusive action of the composite honeycomb structures or buffers (10, 10A), resulting from low energy impact, and to absorb impact in a slanting direction with respect to the vehicle axis.

6. Absorption system as in claim 1, characterised in that said honeycomb structures (10, 10A) are extruded in plastic or injection-moulded in plastic.

7. Absorption system as in claim 1, characterised in that said honeycomb structure (10, 10A) features a tapered profile corresponding to at least one of its longitudinal ends.

8. Absorption system as in claim 1, characterised in that said honeycomb structure (10, 10A) is made of Xenoy® resin in order to ensure high ultimate elongation values and maintain the mechanical characteristics substantially stable over a set temperature range.

9. Absorption system as in claim 1, characterised in that each honeycomb structure (10, 10A) features at least one element (22) for containing or retaining the deformations covering at least one of the longitudinal ends.

10. Absorption system as in claim 7, characterised in that said containment element (22) is made of high-resistance materials.

11. Absorption system as in claim 7, characterised in that said containment element (22) is made integral with said honeycomb structure (10, 10A).

12. Absorption system as in claim 7, characterised in that said containment element (22) is obtained directly on the vehicle.

* * * * *